United States Patent
Diamant et al.

(10) Patent No.: US 7,986,844 B2
(45) Date of Patent: Jul. 26, 2011

(54) OPTIMIZED VIDEO COMPRESSION USING HASHING FUNCTION

(75) Inventors: Nimrod Diamant, Kfar Saba (IL); Gershon Bar-On, Kochav Hashahar (IL)

(73) Assignee: Intel Corporation, Santa Clara, CA (US)

( * ) Notice: Subject to any disclaimer, the term of this patent is extended or adjusted under 35 U.S.C. 154(b) by 1331 days.

(21) Appl. No.: 11/286,513

(22) Filed: Nov. 22, 2005

(65) Prior Publication Data
US 2007/0116110 A1    May 24, 2007

(51) Int. Cl.
G06K 9/36 (2006.01)
G06K 9/68 (2006.01)
G06K 9/00 (2006.01)

(52) U.S. Cl. ......... 382/232; 382/218; 382/219; 382/100

(58) Field of Classification Search .................. 382/232, 382/218, 219, 100
See application file for complete search history.

(56) References Cited

U.S. PATENT DOCUMENTS

| | | | |
|---|---|---|---|
| 4,539,655 A | 9/1985 | Trussell et al. | |
| 4,792,896 A | 12/1988 | Maclean et al. | |
| 5,581,715 A | 12/1996 | Verinsky et al. | |
| 5,812,820 A | 9/1998 | Loram | |
| 5,889,965 A | 3/1999 | Wallach et al. | |
| 6,530,050 B1 | 3/2003 | Mergard | |
| 6,606,164 B1 | 8/2003 | Irie et al. | |
| 6,826,387 B1 | 11/2004 | Kammer | |
| 6,834,326 B1 | 12/2004 | Wang et al. | |
| 6,881,096 B2 | 4/2005 | Brown et al. | |
| 7,003,563 B2 * | 2/2006 | Leigh et al. | 709/223 |
| 7,043,205 B1 | 5/2006 | Caddes et al. | |
| 7,155,512 B2 | 12/2006 | Lean et al. | |
| 7,162,638 B2 * | 1/2007 | Yoshihiro | 713/179 |
| 7,284,278 B2 | 10/2007 | Anson et al. | |
| 7,400,648 B2 | 7/2008 | Cromer et al. | |
| 7,457,847 B2 | 11/2008 | Ramey | |
| 7,543,277 B1 | 6/2009 | Righi et al. | |
| 7,721,013 B2 | 5/2010 | Diamant | |
| 2002/0054029 A1 | 5/2002 | Glancy et al. | |
| 2003/0061401 A1 | 3/2003 | Luciani, Jr. | |
| 2003/0105850 A1 | 6/2003 | Lean et al. | |
| 2003/0194908 A1 | 10/2003 | Brown et al. | |
| 2003/0229727 A1 | 12/2003 | Wang | |
| 2004/0128412 A1 | 7/2004 | Harrison | |
| 2004/0177264 A1 | 9/2004 | Anson et al. | |

(Continued)

OTHER PUBLICATIONS

"Secure Hash Standard" by Federal Infromation Processing Standards Publication 180-1, Apr. 17, 1995.*

(Continued)

Primary Examiner — Bhavesh M Mehta
Assistant Examiner — Utpal Shah
(74) Attorney, Agent, or Firm — Christopher K. Gagne

(57) ABSTRACT

A video redirection system redirects an incoming video stream to a remote console. The video redirection system samples the video stream to generate a currently sampled frame comprising a plurality of tiles, and calculates a current hash value for each of the tiles. The video redirection system compresses the tile if the current hash value is different from a reference hash value locally stored inside the video redirection system. A difference in the hash value indicates that there is a change in the tile of the currently sampled frame from the corresponding tile of the previously sampled frame. Thus, it is no longer necessary to compare the currently sampled frame with a reference frame in the memory. Accordingly, the amount of memory access is reduced.

14 Claims, 3 Drawing Sheets

U.S. PATENT DOCUMENTS

| | | |
|---|---|---|
| 2004/0181590 A1 | 9/2004 | Liou et al. |
| 2004/0249985 A1 | 12/2004 | Mori et al. |
| 2005/0015430 A1 | 1/2005 | Rothman et al. |
| 2006/0059336 A1 | 3/2006 | Miller et al. |
| 2006/0149860 A1 | 7/2006 | Diamant |
| 2006/0168099 A1 | 7/2006 | Diamant |
| 2007/0005821 A1 | 1/2007 | Diamant |
| 2007/0005828 A1 | 1/2007 | Diamant |
| 2007/0005867 A1 | 1/2007 | Diamant |
| 2008/0294800 A1 | 11/2008 | Diamant |

OTHER PUBLICATIONS

"IPMI- Intelligent Platform Management Interface Specification Second Generation v2.0", Table of Contents; Document Revision 1.0, Feb. 12, 2004, 23 Pages.

Office Action received for U.S. Appl. No. 11/027,917, mailed on Sep. 4, 2008, 16 Pages.

Response to Office Action received for U.S. Appl. No. 11/027,917, filed Jan. 5, 2009, 19 Pages.

Office Action received for U.S. Appl. No. 11/027,917, mailed on Apr. 15, 2009, 23 Pages.

Response to Office Action received for U.S. Appl. No. 11/027,917, filed Jun. 12, 2009, 15 Pages.

Office Action received for U.S. Appl. No. 11/027,917, mailed on Aug. 31, 2009, 13 Pages.

Response to Office Action received for U.S. Appl. No. 11/027,917, filed Oct. 9, 2009, 13 Pages.

Microsoft, "Virtual PC 2004 Evaluation Guide", Nov. 2003, pp. 1-20.

Office Action received for U.S. Appl. No. 11/027,754, mailed on Aug. 8, 2007, 24 Pages.

Response to Office Action received for U.S. Appl. No. 11/027,754, filed Jan. 31, 2008, 42 Pages.

Office Action received for U.S. Appl. No. 11/027,754, mailed on May 8, 2008, 26 Pages.

Response to Office Action received for U.S. Appl. No. 11/027,754, filed Jun. 17, 2008, 10 Pages.

Office Action received for U.S. Appl. No. 11/027,754, mailed on Dec. 9, 2008, 9 Pages.

Response to Office Action received for U.S. Appl. No. 11/027,754, filed Mar. 9, 2009, 25 Pages.

Office Action received for U.S. Appl. No. 11/027,754, mailed on Jun. 2, 2009, 9 Pages.

Response to Office Action received for U.S. Appl. No. 11/027,754, filed Jun. 24, 2009, 16 Pages.

Office Action received for U.S. Appl. No. 11/804,836, mailed on Mar. 18, 2009, 10 Pages.

Response to Office Action received for U.S. Appl. No. 11/804,836, filed Jun. 16, 2009, 14 Pages.

Office Action received for U.S. Appl. No. 11/804,836, mailed on Sep. 17, 2009, 9 Pages.

"MegaRAC M200 OPMA Based Remote Management Controller", Data Sheet, American Megatrends, Northbelt Parkway, Norcross GA 30071, Aug. 22, 2005, 2 Pages.

Notice of Allowance received for the U.S. Appl. No. 11/804,836, mailed on Dec. 28, 2009, 12 pages.

Response to Final Office Action received for U.S. Appl. No. 11/804,836, Nov. 12, 2009, 15 pages.

Final Office Action received for U.S. Appl. No. 11/027,917, mailed on Dec. 24, 2009, 23 pages.

Non-Final Office Action received for the U.S. Appl. No. 11/027,917, mailed on Jun. 22, 2010, 19 pages.

Response to Final Office Action received for the U.S. Appl. No. 11/027,917, mailed on Dec. 28, 2009 8 pages.

Response to Final Office Action and Advisory Action received for the U.S. Appl. No. 11/027,917, filed Feb. 26, 2010, 11 pages.

Response to Non-Final Office Action received for the U.S. Appl. No. 11/027,917, field Sep. 22, 2010, 14 pages.

Supplemental Response to Final Office Action and Advisory Action received for the U.S. Appl. No. 11/027,917, filed Mar. 29, 2010, 13 pages.

Final Office Action received for the U.S. Appl. No. 11/027,754, mailed on Sep. 23, 2010, 18 pages.

Response to Non-Final Office Action received for the U.S. Appl. No. 11/027,754, field Jul. 15, 2010, 19 pages.

Non-Final Office Action received for the U.S. Appl. No. 11/027,754, mailed on Mar. 15, 2010, 20 pages.

Supplemental Response to Final Office Action received for U.S. Appl. No. 11/027,754, filed Dec. 28, 2009, 10 pages.

Supplemental Response to Final Office Action received for the U.S. Appl. No. 11/804,836, filed Dec. 28, 2009, 9 pages.

Final Office Action received for the U.S. Appl. 11/027,917, mailed on Oct. 29, 2010, 20 pages.

Advisory Action received for the U.S. Appl. No. 11/027,917, mailed on Mar. 15, 2010, 3 pages.

Advisory Action received for the U.S. Appl. No. 11/027,917, mailed on Jan. 13, 2010, 3 pages.

Advisory Action received for the U.S. Appl. No. 11/027,754, mailed on Jun. 30, 2008, 3 pages.

* cited by examiner

OPTIMIZED VIDEO COMPRESSION USING HASHING FUNCTION

BACKGROUND

Keyboard, video, and mouse (KVM) redirection refers to the redirection of signals from a keyboard, a video source, or a mouse to a site remote to the keyboard, the video source, or the mouse. KVM redirection is typically used for the maintenance and configuration of computers at a remote site. In an enterprise environment, KVM redirection allows an information technology (IT) team to administer and maintain corporate servers and desktop computers through a network without being physically present at the location of the computers. In a server environment, it is unlikely to allocate a console to each server where the servers are clustered in a computer room. KVM redirection allows an IT team to manage the servers through a network from one single remote location.

One of the most common implementations of video redirection is based on tile compression algorithms. These algorithms typically split the screen into rectangles of pixel data (e.g., tiles of 64×64 pixels each), and look for changes in the corresponding tiles between subsequently sampled frames. If a change is detected, the tile from the currently sampled frame is compressed and sent, or redirected, to a remote console. Otherwise, no action is taken with respect to that tile. An example of an algorithm and network protocol is the Virtual Network Computing (VNC) based on the Remote Frame Buffer (RFB) protocol.

FIG. 1 shows an example of a video redirection system 11 which implements the tile compression algorithm mentioned above. Video redirection system 11 redirects a video stream from a video source 14 to a remote console via a network interface 13. Video redirection system 11 is coupled to a memory 12 via a memory bus 15. Memory 12 includes a current frame buffer 121 for storing a currently sampled frame, a reference frame buffer 122 for storing a reference sampled frame (hereinafter "a reference frame"), and a compressed tile buffer 123 for storing compressed tiles of the currently sampled frame.

When a new screen shot of video stream is to be redirected to a remote viewer, a frame sampler 111 of video redirection system 11 grabs a frame and saves it into current frame buffer 121. Grabbing a frame may involve sampling the video at a pre-determined rate to comply with a desired resolution. After an entire frame is sampled and saved, a tile comparator 112 of video redirection system 11 reads the frame from current frame buffer 121 and a reference frame from reference frame buffer 122 via memory bus 15. Tile comparator 112 compares the two frames, tile by tile, to determine if any tile of the currently sampled frame is different from the corresponding tile of the reference frame. If a tile is different, the tile is sent to a compression module 113 for compression. The compressed tiles are buffered in compressed tile buffer 123 before being sent to a network module 114 of video redirection system 11 for transmission to the remote console. Thereafter, the content of current frame buffer 121 becomes the reference frame as a new frame cycle begins.

The aforementioned operations make heavy use of memory bus 15. In every frame cycle, both the currently sampled frame and the reference frame are read from memory 12. This creates a burden to the memory bandwidth and requires a high performance memory to be used. A fast and wide memory array may accommodate the bandwidth required by the above operations but the cost is high.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 2:
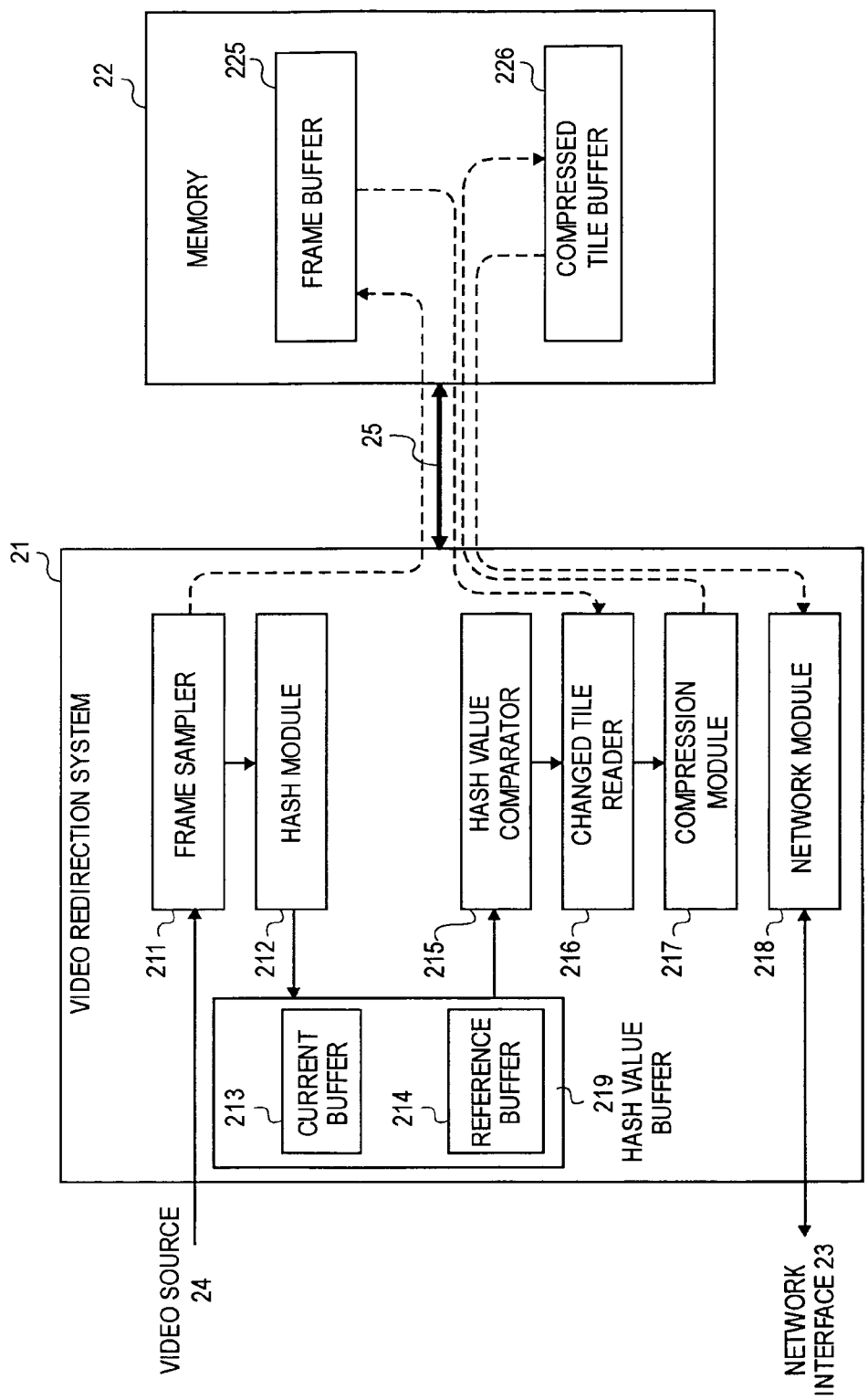
FIG. 2 is a block diagram of an embodiment of a video redirection system performing a hash operation on incoming video streams.

FIG. 2 shows an embodiment of a video redirection system 21 coupled to a memory 22 via a memory bus 25. In one embodiment, video redirection system 21 may be a video server dedicated to online delivery of streaming videos. Alternatively, video redirection system 21 may be part of a server or client system for processing video streams transmitted to or generated by the server or client. Video redirection system 21 may receive video streams from a video source 24, e.g., the screen output of a computer video controller, a content provider, a camera, or a broadcaster, and may be controllable by a remote console via a network interface 23. The remote console may be directly coupled to network interface 23, or indirectly coupled to network interface 23 via a network, e.g., local area network (LAN), wide area network (WAN), the Internet, or similar wired or wireless networks. Memory 22 may be a volatile memory, e.g., a static random access memory (SRAM), an array of memory devices, or other similar memory devices that may or may not be on the same chip or package as video redirection system 21. Memory 22 may be dedicated to video redirection system 21, a shared memory, or any other data storage devices. In the embodiment as shown, memory 22 contains a frame buffer 225 for storing a currently sampled frame and a compressed tile buffer 226 for storing compressed tiles of the currently sampled frame. In an alternative embodiment, frame buffer 225 and compressed tile buffer 226 may be located in different memory devices accessible by video redirection system 21.

Figure 1:
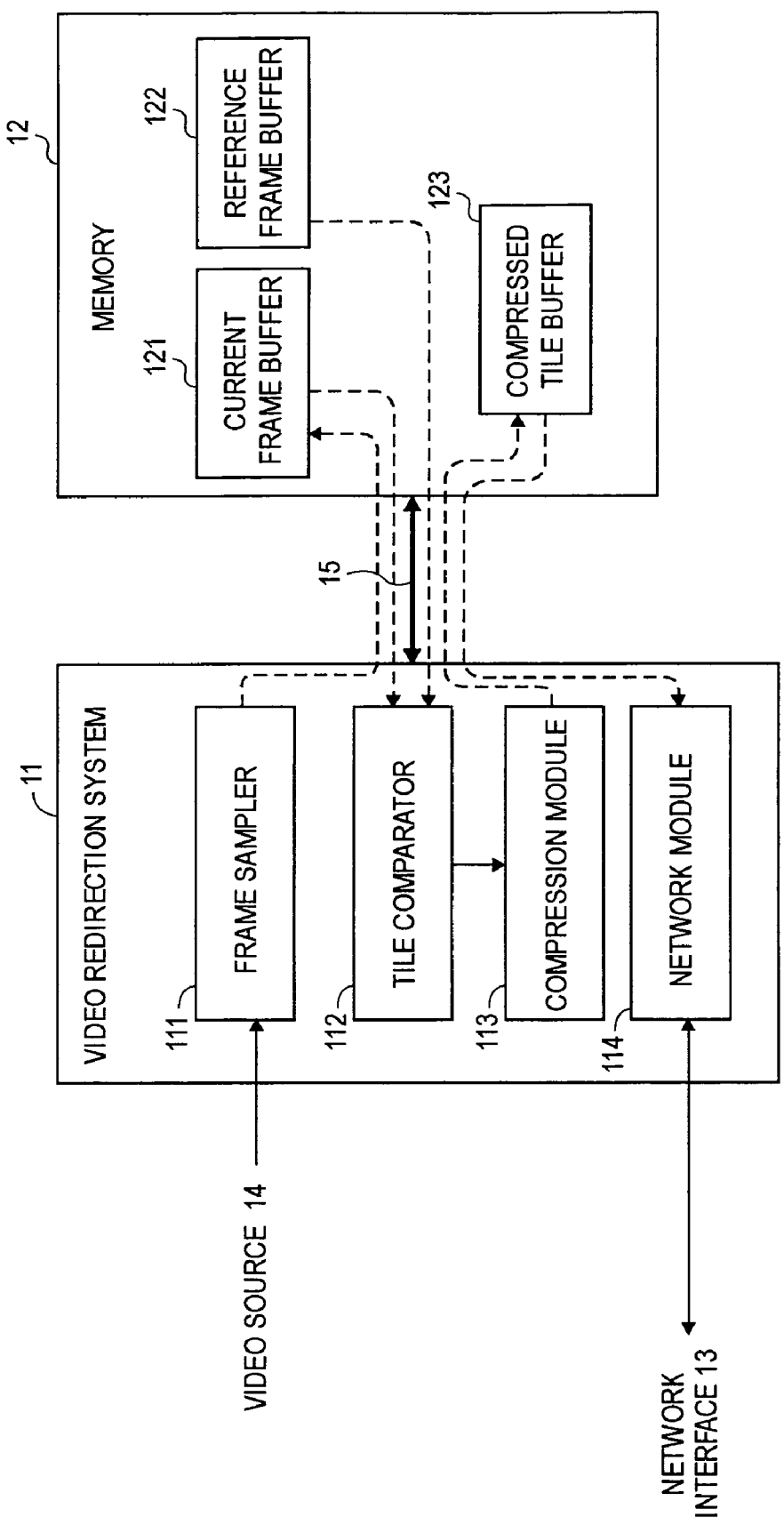
FIG. 1 is a block diagram of a prior art video redirection system.

Video redirection system 21 includes a frame sampler 211 for sampling incoming video streams. The sampled frame is stored in frame buffer 225 in memory 22. In contrast to memory 11 of video redirection system 11 (FIG. 1) where both a currently sampled frame and a reference sampled frame are stored, memory 22 merely stores a currently sampled frame. This is because video redirection system 21 does not use a reference sampled frame for tile comparisons. Instead, video redirection system 21 uses a hash module 212 for determining whether a tile of a currently sampled video frame is different from a corresponding tile in a reference sampled frame.

Hash module 212 implements a hash algorithm which maps an input of a relatively large domain (e.g., a tile) into to a hash value of a relatively small domain. The mapping into a smaller domain means that there are fewer bits in a hash value than in a tile. Thus, these smaller hash values may be stored locally in video redirection system 21. These hash values represent the newly sampled tiles and may be compared with hash values of the tiles of a reference frame. As a result, the number of memory reads may be reduced because there is no longer a need to retrieve a reference frame from memory 22 for the purpose of tile comparisons.

Hash module 212 may implement any known hash algorithms. Logic circuits and software for implementing hash algorithms are known in the art. For example, the Secure Hash Algorithm (SHA-1) algorithm, often adopted by security algorithms for user authentication and signature verification, may be used to map a tile of any size into 160-bit output. Thus, for a tile of 16×16 pixel with 24 bits per pixel, the reduction ratio is 160:(16×16×24)=1:38.4. The reduction in the domain size may sometimes cause collision, meaning that different inputs are mapped to the same output. A collision may cause missed detection of a tile change because different tiles are mapped to the same hash value. The SHA-1 algorithm has a low probability of collision ($2^{-160}$). Thus, the probability of missing a tile change because of hash collision is negligible. Alternative hash algorithms, e.g., SHA-2 or Message-Digest Algorithm 5 (MD5), may have different probability of collision and achieve different reduction ratio in the output bits.

In one embodiment, hash module 212 may store the hash values output in a hash value buffer 219 of video redirection system 21. Hash value buffer 219 may designate a current buffer 213 for storing the hash values of the tiles of the currently sampled frame, and a reference buffer 214 for storing the hash values of the tiles of a reference frame. At the end of a frame cycle, the content of current buffer 213 may be copied into the reference buffer 214 to become the new reference hash values. Alternatively, buffers 213 and 214 may be implemented as a double buffer. At the end of a frame cycle, the designation of current buffer 213 and reference buffer 214 may be swapped to avoid the copying operations.

Figure 3:
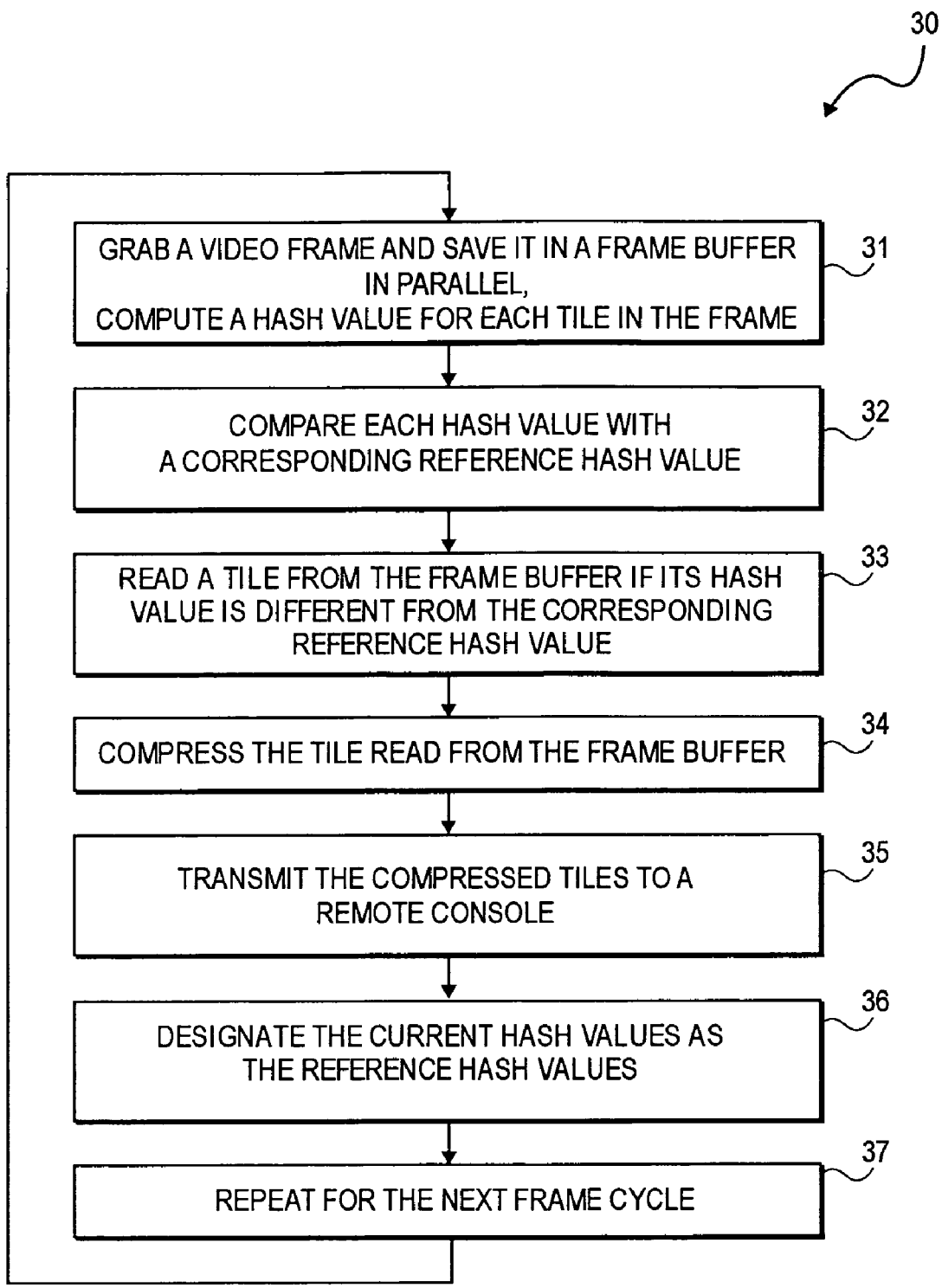
FIG. 3 is a flowchart showing an embodiment of the operations performed by the video redirection system of FIG. 2.

FIG. 3 is an embodiment of a flowchart 30 illustrating the operations of video redirection system 21. Referring also to FIG. 2, at block 31, frame sampler 211 of video redirection system 21 samples the incoming video stream to obtain information bits of a frame, and stores the frame in frame buffer 225 of memory 22. In parallel, frame sampler 211 sends the frame to hash module 212. In one embodiment, frame sampler 211 may send the samples of the frame to frame buffer 225 and hash module 212 as the information bits are sampled.

A video stream carries pixel information of the frame sequentially in a line by line manner. Thus, the sampled bits are also sequentially ordered. In one embodiment, hash module 212 includes an internal buffer to accumulate the sampled bits. As a tile is usually a square or rectangular block of image, hash module 212 may accumulate several lines of a frame before forming one or more tiles. Hash module 212 computes the hash values for each of the tiles as the tiles are accumulated, and temporarily stores the hash values in current buffer 213 of video redirection system 21.

Video redirection system 21 may also include a hash value comparator 215 which compares two hash values to determine whether there is a difference. Hash value comparator 215 may be implemented by logic circuits or a software module executable by a microcontroller. At block 32, hash value comparator 215 compares the hash values in current buffer 213 with the corresponding reference hash values in reference buffer 214. A corresponding reference hash value is the hash value of a tile of a previously sampled frame that occupies the same location in a frame as the tile of the currently sampled frame. If hash value comparator 215 determines there is a difference between the current hash value and the corresponding reference hash value, hash value comparator 215 signals a changed tile reader 216 with an identifier or an address of the tile to enable a memory read. If hash value comparator 215 determines there is no difference between the two hash values, no memory read is enabled for the tile. Changed tile reader 216 may be implemented as a hardware or software interface for reading specific data locations from memory 22. In one embodiment, changed tile reader 216 may be implemented as a standard memory interface for reading specific addresses of data units in memory 22.

In one embodiment, hash value comparator 215 may signal changed tile reader 216 with an identifier or address of a tile every time a difference in hash values is detected. Alternatively, hash value comparator 215 may compile a list of all the tiles having different hash values from the corresponding reference hash values. Hash value comparator 215 may send the entire list to changed tile reader 216 after all the tiles of the currently sampled frame are processed. The choice of implementation may depend on the speed of compression module 217 and the bandwidth of memory bus 25.

At block 33, changed tile reader 216 reads the tiles having changed hash values from frame buffer 225, and forwards the tiles to a compression module 217 of video redirection system 21. At block 34, compression module 217 compresses the tiles, using any lossless compression algorithms, e.g., runlength coding or Lempel-Ziv coding. Compression circuits or software for implementing the lossless compression algorithms are well known in the art. Compression module 217 may alternatively implement lossy compression algorithms, e.g., moving picture experts group (MPEG) or similar algorithms, for applications that can tolerate data loss. However, the common video compression standards such as MPEG may not be adequate for the compression of a computer screen where textual images predominate, because these standards suffer from information loss as a result of the reduced compression ratio. Textual images generally have sharper edges than a typical video application and thus may not be a suitable candidate for lossy compressions. However, in applications where textual images do not predominate, lossy compression algorithms may be used.

Following the compression, compression module 217 temporarily stores the compressed tiles in compressed tile buffer 226. In an alternative embodiment, compressed tile buffer 226 may be internal to compression module 217 if space allows. At block 35, a network module 218 of video redirection system 21 retrieves the compressed tiles from compressed tile buffer 226 and transmits the compressed tiles to a remote console via network interface 23 according to a predetermined protocol, e.g., the Virtual Network Computing (VNC) based on the Remote Frame Buffer (RFB) protocol, or other proprietary protocols.

At block 36, video redirection system 21 designates the current hash values in current buffer 213 as the reference hash values. Video redirection system may replace the entire content of reference buffer 214 with the content of buffer 213, or replace only the hash values of the changed tiles. Alternatively, the designation of current and reference buffers 213 and 214 may be swapped without making a real copy of the hash values. Thereafter, at block 37, video redirection system 21 repeats the operations of blocks 31-36 for the next frame cycle. In one embodiment, the video redirection system 21 may repeat the operations when prompted by a request from a viewer program at the remote management console. The speed at which the video streams are redirected may depend on the processing speed of the remote console and the connection thereto.

The aforementioned embodiments have the advantages of speed, efficiency, and cost-effectiveness. The size of memory 22 may be reduced, as the memory is no longer required to store a reference frame. Memory bandwidth is also reduce because only the tiles different from the reference frame are read from memory 22. As a consequence, power consumption at the memory interface is minimized.

In the foregoing specification, specific embodiments have been described. It will, however, be evident that various modifications and changes can be made thereto without departing from the broader spirit and scope of the appended claims. The specification and drawings are, accordingly, to be regarded in an illustrative rather than a restrictive sense.

What is claimed is:

1. A method comprising:
calculating a current hash value for a current tile of a currently sampled video frame that is stored in buffer memory to be accessed by a video redirection system, the tile having a first bit size, the current hash value having a second bit size, the first bit size being relatively larger than the second bit size, the current hash value being calculated by a hash algorithm that maps the tile into the current hash value;
making a comparison of the current hash value to a reference hash value, the reference hash value having the second bit size and being calculated by the hash algorithm based upon a corresponding tile of another sampled video frame that was sampled prior to the currently sampled video frame, the buffer memory storing the reference hash value but lacking storage of the another sampled video frame;
processing the current tile based upon result of the comparison, the processing comprising compressing the current tile, if the current hash value is different from the reference hash value, to produce a compressed tile; and
transmitting the compressed tile via a network interface.

2. The method of claim 1 further comprising:
designating the current hash value as the reference hash value after processing the current tile.

3. The method of claim 1 wherein processing the current tile further comprises:
reading the current tile from a frame buffer if the current hash value is different from the reference hash value.

4. The method of claim 1 wherein calculating a current hash value comprises:
calculating the current hash value concurrently with storing the currently sampled video frame into a frame buffer.

5. An apparatus comprising:
a hash module to calculate a current hash value for a current tile of a currently sampled video frame that is to be stored in buffer memory to be accessed by a video redirection system, the tile having a first bit size, the current hash value having a second bit size, the first bit size being relatively larger than the second bit size, the current hash value being calculated by a hash algorithm that maps the tile into the current hash value;
a comparator to make a comparison of the current hash value to a reference hash value, the reference hash value having the second bit size and being calculated by the hash algorithm based upon a corresponding tile of another sampled video frame sampled prior to the currently sampled video frame, the buffer memory to store the reference hash value but to lack storage of the another sampled video frame;
tile reader hardware coupled to the comparator to read the current tile from the memory if the current hash value is different from the reference hash value;
a compression module to compress the current tile based upon result of the comparison, to produce a compressed tile; and
a network interface to transmit the compressed tile.

6. The apparatus of claim 5 further comprising:
a hash value buffer coupled to the hash module and the comparator to store the current hash value and the reference hash value.

7. The apparatus of claim 6 wherein the hash value buffer is a double buffer.

8. The apparatus of claim 5 further comprising:
a network module to send the current tile to a remote console through a communication network according to a video redirection protocol.

9. The apparatus of claim 8 wherein the video redirection protocol is a virtual network computing (VNC) protocol.

10. A system comprising:
a hash module to calculate a current hash value for a current tile of a currently sampled video frame that is to be stored in buffer memory to be accessed by a video redirection system, the tile having a first bit size, the current hash value having a second bit size, the first bit size being relatively larger than the second bit size, the current hash value being calculated by a hash algorithm that maps the tile into the current hash value;
a comparator to make a comparison of the current hash value to a reference hash value, the reference hash value having the second bit size and being calculated by the hash algorithm based upon a corresponding tile of another sampled video frame sampled prior to the currently sampled video frame, the buffer memory to store the reference hash value but to lack storage of the another sampled video frame;
tile reader hardware coupled to the comparator to read the current tile from the buffer memory if the current hash value is different from the reference hash value;
the buffer memory including frame buffer memory coupled to the tile reader hardware via an interconnect network to store the currently sampled video frame;
a compression module to compress the current tile, based upon result of the comparison, to produce a compressed tile; and
a network interface to transmit the compressed tile.

11. The system of claim 10 further comprising:
a hash value buffer coupled to the hash module and the comparator to store the current hash value and the reference hash value.

12. The system of claim 11 wherein the hash value buffer is a double buffer.

13. The system of claim 10 further comprising:
a network module coupled to the network interface to send the current tile to the remote console according to a video redirection protocol.

14. The system of claim 8 wherein the video redirection protocol is a virtual network computing (VNC) protocol.

* * * * *